Patented Feb. 10, 1948

2,435,658

UNITED STATES PATENT OFFICE 2,435,658

ILLUMINATED DISCHARGE EFFECTS UPON ACETATE FABRICS

George W. Seymour, George C. Ward, and Robert L. Hunter, Cumberland, Md., assignors to Celanese Corporation of America, a corporation of Delaware No Drawing. Application July 19, 1944, Serial No. 545,731

10 Claims. (Cl. 8—64)

This invention relates to the coloration of textile materials and relates more particularly to the discharge printing of cellulose acetate or other organic derivative of cellulose materials in clear, sharp patterns.

An object of this invention is to provide an improved process for the discharge printing of cellulose acetate or other organic derivative of cellulose materials.

Another object of this invention is the discharge printing of cellulose acetate or other organic derivative of cellulose fabrics in clear, sharply defined white patterns which may be simultaneously illuminated with fast vat colors.

A further object of this invention is the discharge printing and illumination of cellulose acetate or other organic ester of cellulose fabrics with vat colors without the saponification of the cellulose ester materials.

Other objects of this invention will appear from the following detailed description.

The production of patterned effects on textile materials may be obtained in a simple and economical manner by discharge printing methods wherein the fabric to be printed is dyed in the piece in solid color employing a suitable dyestuff to provide the desired background color. Where azo dyestuffs are employed for the background, a chemically active discharge paste having a reducing action on the azo dye is applied locally to the fabric in a predetermined pattern. The fabric carrying the discharge paste is then treated so that the azo dye is reduced and the background color removed at those areas where the paste has been applied. This process yields a discharged pattern or design upon a colored background. The discharged areas should preferably have a clear, white color and the line of demarcation between the colored background and discharged area should be sharp and distinct.

Where patterns or designs in color are desired instead of in white, that is, where it is desired to illuminate the discharge print, there is usually applied simultaneously with the discharge paste for the ground color, a dyestuff which is resistant to the reducing action of the discharge agent and is itself a dye for the fabric, for example, vat dyestuffs which can be reversibly oxidized after being vatted to the leuco form. The vat dyestuffs are applied to the fabric mixed in with the discharge paste. In order that the vat dyestuffs be sufficiently solubilized in the discharge paste so that they can penetrate the cellulose acetate or other organic ester of cellulose fabric properly and give even and permanent colors, the discharge paste must be alkaline in reaction since the vat dyes normally employed for printing cellulose acetate or other organic ester of cellulose materials cannot be adequately solubilized in an acid medium. When employing alkaline discharge pastes, however, in the discharge printing of cellulose acetate fabrics, the printed portions of the fabric usually undergo some degree of saponification due to the alkaline nature of the paste. This saponification tends to weaken the fabric in the printed areas. Furthermore, when employing alkaline discharge agents, an undesirable degree of flushing is usually present so that the discharge paste yields a printed pattern of poor definition and of irregular outline. The limitations inherent in the application of alkaline discharging agents to discharge printing operations is particularly evident in the case of cellulose acetate or other organic ester of cellulose fabrics dyed in the ground with certain azo dyestuffs, particularly those dyed with certain blue shades which have the quality of being resistant to acid fading. While these shades are extremely valuable due to their resistance to acid fading, clear, white discharge patterns cannot be obtained with alkaline discharging agents. When these blue shades are discharged with alkaline agents, the pattern obtained is usually an off-shade of white having an undesirable brownish, pinkish, or yellowish tint. These off-shade tints frequently interfere with the satisfactory illumination of the discharged areas.

Even though the use of alkaline discharging agents is undesirable in the above respects, no entirely satisfactory illuminating discharge printing process has heretofore been available whereby the use of said alkaline agents may be dispensed with.

We have now discovered that clear, untinted white, as well as sharply-defined illuminated discharge prints, may be obtained on cellulose acetate, or other organic ester of cellulose fabrics, without saponification of the cellulose ester materials comprising the fabric, by the application of certain acid discharging agents in combination with illuminating colors comprising the sulfuric acid esters of leuco vat dyestuffs and an oxidizing agent effective upon acidification. In accordance with the process of our invention, we prepare discharge printing pastes containing illuminating colors comprising the sulfuric acid esters of leuco vat dyestuffs having as their active discharging component an acid reacting discharging agent, e. g., zinc sulfoxylate formaldehyde, containing a textile gum thickener, an oxidizing agent effective on acidification, together with suitable solvents and penetrating agents, and apply said paste locally to cellulose ester materials dyed in a dischargeable ground color. The printed fabric is aged for a short time, say 5 to 15 minutes, to reduce the dischageable ground color, and the illuminating color is then developed by immersing the aged fabric in an acid bath whereby the oxidizing agent present in the paste effects an oxidation of the leuco vat sulfuric acid ester dyestuff. After development of the illuminating color is completed, the fabric is rinsed, soaped and finished.

The application of acid discharging agents enables the ground color to be completely discharged without saponification of the cellulose ester textile material and, therefore, without flushing at the edges of the print. This complete and colorless discharge is especially advantageous in the case of certain excellent azo dyestuffs yielding direct dyeing blue shades which, as previously indicated, cannot be adequately discharged with alkaline discharge agents. Typical of such azo dyestuffs are those carrying 4-acylamino-2-di-hydroxyalkyl-amino substituents in one benzene nucleus of the azo dyestuff. The use of the sulfuric acid ester leuco vat dyestuffs for illumination in the discharge pastes makes possible the simultaneous illumination of the resulting clear, white discharge pattern in colors fast to light and acid fading. If the illuminating vat colors normally employed for illuminating cellulose acetate or other organic derivative of cellulose fabrics are employed with acid discharge agents in connection with the discharge of said blue colors, the vat dyestuffs cannot be solubilized properly and the resulting illuminations tend to crock as well as to suffer from other faults which detract seriously from their usefulness.

In forming the discharge pastes various solvents, softening or penetrating agents may be incorporated therein to increase the effectiveness of the discharge paste. Examples of suitable agents are organic liquids such as ethyl alcohol, the monoethyl ether of ethylene glycol, isopropyl alcohol or butyl alcohol, as well as inorganic swelling agents for the cellulose ester material such as sodium thiocyanate or other alkali salts of thiocyanic acid. Thus, for example, the ethyl alcohol present may comprise 15 to 50% by weight of the paste while the ethylene glycol mono-ethyl ether may be present in amounts of from 5 to 20% by weight. Assistants such as urea are also preferably incorporated in the paste to aid the printing operation in an amount comprising 3 to 10% by weight of the paste.

The oxidation of the sulfuric acid ester of the leuco vat dyestuff employed for illumination to the colored form after the printed fabric is aged, is effected by incorporating in the paste an inorganic salt which yields an oxidizing acid on acidification. As an example of a suitable salt there may be mentioned sodium nitrite, which yields nitrous acid on acidification. The presence of the oxidizing agent in the illuminating discharge printing paste effects a rapid and direct oxidation of the leuco vat dyestuff to the colored form, thus yielding a strong, bright illuminated pattern. The acidification bath itself, which preferably comprises a ½ to 4% solution of sulfuric acid should also contain, in addition, another oxidizing agent, such as, for example, sodium bichromate, to aid further in the oxidation of the leuco vat dyestuff to the colored form. Where sodium bichromate is employed it may be present in the bath in a concentration of 0.05 to 2% by weight. The acidification may be effected at temperatures of 20 to 90° C. for ½ to 30 minutes but optimum results are achieved by employing a bath at about 80° C. and maintaining the fabric therein for about one minute.

Any suitable leuco vat dyestuff sulfuric acid ester may be employed as the illuminating color. These dyestuffs are prepared by reducing vat dyestuffs to the leuco form by means of a suitable vatting or reducing agent and then reacting the vatted dyestuff with sulfuric acid or with chlorsulfuric acid. These solubilized dyestuffs are usually employed in the form of their salts.

The dischargeable ground colors which are satisfactorily employed in connection with our novel discharge process are those dyestuffs containing azo linkages which may be split by the action of the acid discharging agent when reduced in the ager and which yield discharge products relatively easily removable from the fabric. Where no illuminating dyestuff is employed clear white discharge patterns are obtained. Thus, both white and illuminated patterns may be obtained in but a single operation by simultaneously applying pastes of which all but one contain an illuminating color.

In order further to illustrate our invention but without being limited thereto the following examples are given:

*Example I*

A cellulose acetate fabric dyed in a blue shade with 6-chlor-2,4-dinitro-benzene-azo-2-di-hydroxyethyl-amino-4-acetyl-amino-anisole is locally printed with a printing paste of the following composition:

| | Parts by weight |
|---|---|
| Scarlet vat dyestuff (leuco sulfuric acid ester) | 25 |
| Mono-ethyl ether of ethylene glycol | 20 |
| Ethyl alcohol | 50 |
| Sodium thiocyanate | 30 |
| Sodium nitrite | 15 |
| Urea | 5 |
| Water | 62.5 |
| Gum tragacanth | 70 |
| Zinc sulfoxylate formaldehyde | 32 |

The printed fabric is dried and then aged for 12 minutes at 102° C. in the continuous ager. The illuminating color is developed by placing the aged fabric in an aqueous acidification bath containing 3.8% sulfuric acid and 0.5% sodium bichromate for 15 minutes at 50° C. The fabric is then rinsed, soaped in 0.5% soap solution at 65° C. for 10 minutes and then rinsed and dried. The finished fabric carries a red design on a blue ground. The dyed fabric is extremely fast to light and acid fading both in the ground color and printed areas. The latter are clear, sharp and distinct, are free of flushing, and the cellulose acetate material of the printed areas is unsaponified.

Example II

A cellulose acetate fabric of a satin weave and dyed a blue shade as in Example I is locally printed with an illuminating discharge paste of the following composition:

| | Parts by weight |
|---|---|
| Violet vat dyestuff (leuco sulfuric acid ester) | 25 |
| Mono-ethyl ether of ethylene glycol | 20 |
| Ethyl alcohol | 25 |
| Sodium thiocyanate | 20 |
| Sodium nitrite | 15 |
| Urea | 5 |
| Water | 62.5 |
| Gum Tragacanth | 81 |
| Zinc sulfoxylate formaldehyde | 32 |

The printed fabric is dried and aged for 12 minutes at 102° C. in the continuous ager. The dried printed fabric is then acidified in a 3.8% aqueous solution of sulfuric acid containing 0.5% of sodium bichromate for 1 minute at 80° C. This treatment develops the illuminating color. The fabric is then rinsed, soaped in 0.5% soap solution at 65° C. for 10 minutes and then washed, dried and finished. The fabric carries a violet pattern on a blue ground and both ground and illuminated pattern are extremely fast to light and acid fading. The development at 80° C. for 1 minute yields fabrics which are wholly free of undesirable discolorations.

The organic derivative of cellulose textile materials which may be discharged printed in accordance with the process of our invention may have a basis of a cellulose ester or cellulose ether. Examples of cellulose esters are cellulose acetate, cellulose propionate, cellulose butyrate, mixed esters such as cellulose acetate-propionate and cellulose acetate-butyrate, while examples of cellulose ethers are ethyl cellulose and benzyl cellulose.

It is to be understood that the foregoing detailed description is given merely by way of illustration and that many variations may be made therein without departing from the spirit of our invention.

Having described our invention what we desire to secure by Letters Patent is:

1. Process for the production of illuminated discharge effects upon an organic derivative of cellulose textile material dyed in a dischargeable azo ground color, which comprises locally applying to said organic derivative of cellulose textile material in a predetermined pattern a discharge printing paste comprising a discharge agent of acid reaction, an illuminating color comprising the sulfuric acid ester of a leuco vat dyestuff and an oxidizing agent for developing said leuco vat dyestuff which is activated upon acidification, discharging the ground color and developing the vat color to the final shade in an acid medium.

2. Process for the production of illuminated discharge effects upon cellulose acetate textile material dyed in a dischargeable azo ground color, which comprises locally applying to said cellulose acetate textile material in a predetermined pattern a discharge printing paste comprising a discharge agent of acid reaction, an illuminating color comprising the sulfuric acid ester of a leuco vat dyestuff and an oxidizing agent for developing said leuco vat dyestuff which is activated upon acidification, discharging the ground color and developing the vat color to the final shade in an acid medium.

3. Process for the production of illuminated discharge effects upon an organic derivative of cellulose textile material dyed in a dischargeable azo ground color, which comprises locally applying to said organic derivative of cellulose textile material in a predetermined pattern a discharge printing paste comprising a discharge agent of acid reaction, an illuminating color comprising the sulfuric acid ester of a leuco vat dyestuff, swelling agents for said organic derivative of cellulose material, and a nitrite, discharging the ground color and developing the vat color to the final shade in an acid medium.

4. Process for the production of illuminated discharge effects upon an organic derivative of cellulose textile material dyed in a dischargeable azo ground color, which comprises locally applying to said organic derivative of cellulose textile material in a predetermined pattern a discharge printing paste comprising a discharge agent of acid reaction, an illuminating color comprising the sulfuric acid ester of a leuco vat dyestuff, swelling agents for said organic derivative of cellulose material, and an oxidizing agent for developing said leuco vat dyestuff which is activated upon acidification, discharging the ground color and developing the vat color to the final shade by entering the discharged fabric into an acid bath.

5. Process for the production of illuminated discharge effects upon cellulose acetate textile material dyed in a dischargeable azo ground color, which comprises locally applying to said cellulose acetate textile material in a predetermined pattern a discharge printing paste comprising a discharge agent of acid reaction, an illuminating color comprising the sulfuric acid ester of a leuco vat dyestuff, swelling agents for said cellulose acetate material, and sodium nitrite, discharging the ground color and developing the vat color to the final shade by entering the discharged fabric into an acid bath.

6. Process for the production of illuminated discharge effects upon cellulose acetate textile material dyed in a dischargeable azo ground color, which comprises locally applying to said cellulose acetate textile material in a predetermined pattern a discharge printing paste comprising a discharge agent of acid reaction, an illuminating color comprising the sulfuric acid ester of a leuco vat dyestuff, swelling agents for said cellulose acetate material, and an oxidizing agent for developing said leuco vat dyestuff which is activated upon acidification, discharging the ground color and developing the vat color to the final shade by entering the discharged fabric into an acid bath, containing an added oxidizing agent.

7. Process for the production of illuminated discharge effects upon cellulose acetate textile material dyed in a dischargeable azo ground color, which comprises locally applying to said cellulose acetate textile material in a predetermined pattern a discharge printing paste comprising a discharge agent of acid reaction, an illuminating color comprising the sulfuric acid ester of a leuco vat dyestuff, swelling agents for said cellulose acetate material, and sodium nitrite, discharging the ground color and developing the vat color to the final shade by entering the discharged fabric into an acid bath containing from ½ to 4% of sulfuric acid and from 0.05 to 2% of sodium bichromate.

8. Process for the production of illuminated discharge effects upon cellulose acetate textile material dyed in a dischargeable azo ground color, which comprises locally applying to said cellulose acetate textile material in a predetermined pattern a discharge printing paste comprising a discharge agent of acid reaction, an illuminating color comprising the sulfuric acid ester of a leuco vat dyestuff, swelling agents for said cellulose acetate material, and sodium nitrite, discharging the ground color and developing the vat color to the final shade by entering the discharged fabric into an acid bath containing from ½ to 4% of sulfuric acid and from 0.05 to 2% of sodium bichromate at a temperature of 20 to 90° C. and maintaining the fabric in the acid developing bath for ½ to 30 minutes.

9. Process for the production of illuminated discharge effects on cellulose acetate textile materials dyed in a dischargeable azo ground color, which comprises locally applying to said cellulose acetate textile material in a predetermined pattern a discharge printing paste comprising zinc sulfoxylate formaldehyde of acid reaction, an illuminating color comprising the sulfuric acid ester of a leuco vat dyestuff, organic and inorganic swelling agents for said cellulose acetate material, and an oxidizing agent for developing said leuco vat dyestuff which is activated upon acidification, discharging the ground color and developing the vat color to the final shade by entering the discharged fabric into an acid bath containing from ½ to 4% of sulfuric acid and from 0.05 to 2% of sodium bichromate at a temperature of 20 to 90° C. and maintaining the fabric in the acid developing bath for ½ to 30 minutes.

10. Process for the production of illuminated discharge effects on cellulose acetate textile materials dyed in a dischargeable azo ground color, which comprises locally applying to said cellulose acetate textile material in a predetermined pattern a discharge printing paste comprising zinc sulfoxylate formaldehyde of acid reaction, an illuminating color comprising the sulfuric acid ester of a leuco vat dyestuff, organic and inorganic swelling agents for said cellulose acetate material, and sodium nitrite, discharging the ground color and developing the vat color to the final shade by entering the discharged fabric into an acid bath containing from ½ to 4% of sulfuric acid and from 0.05 to 2% of sodium bichromate at a temperature of 20 to 90° C. and maintaining the fabric in the acid developing bath for ½ to 30 minutes.

GEORGE W. SEYMOUR.
GEORGE C. WARD.
ROBERT L. HUNTER.

REFERENCES CITED

The following references are of record in the file of this patent:

UNITED STATES PATENTS

| Number | Name | Date |
|---|---|---|
| 1,864,007 | Werdenberg | June 21, 1932 |
| 2,029,351 | Wormald | Feb. 4, 1936 |
| 1,816,766 | Niederhausern | July 28, 1931 |
| 1,575,958 | Bader | Mar. 9, 1926 |
| 2,005,182 | Ellis | June 18, 1935 |
| 2,193,749 | Tschan | Mar. 12, 1940 |
| 2,115,374 | Wainwright | Apr. 26, 1938 |
| 2,010,854 | Ellis | Aug. 13, 1935 |

FOREIGN PATENTS

| Number | Country | Date |
|---|---|---|
| 495,403 | Great Britain | Nov. 14, 1938 |
| 400,643 | Great Britain | Oct. 23, 1933 |
| 529,480 | Germany | July 17, 1931 |